United States Patent
Chmielewski et al.

(10) Patent No.: US 9,096,039 B2
(45) Date of Patent: Aug. 4, 2015

(54) STRUCTURAL COMPOSITE LAMINATES

(75) Inventors: Craig Chmielewski, Shelby Township, MI (US); Brandon Madaus, Richmond, MI (US)

(73) Assignee: ZEPHYROS, INC., Romeo, MI (US)

( * ) Notice: Subject to any disclaimer, the term of this patent is extended or adjusted under 35 U.S.C. 154(b) by 302 days.

(21) Appl. No.: 13/040,704

(22) Filed: Mar. 4, 2011

(65) Prior Publication Data

US 2012/0028032 A1     Feb. 2, 2012

Related U.S. Application Data

(60) Provisional application No. 61/310,580, filed on Mar. 4, 2010.

(51) Int. Cl.
*B32B 5/20* (2006.01)
*B29C 44/12* (2006.01)
(Continued)

(52) U.S. Cl.
CPC ............. *B32B 27/065* (2013.01); *B29C 44/128* (2013.01); *B29C 44/18* (2013.01); *B32B 5/18* (2013.01); *B32B 5/20* (2013.01); *B32B 15/046* (2013.01); *B32B 15/092* (2013.01); *B32B 27/281* (2013.01); *B32B 27/285* (2013.01); *B32B 27/286* (2013.01); *B32B 27/30* (2013.01); *B32B 27/304* (2013.01); *B32B 27/306* (2013.01); *B32B 27/308* (2013.01); *B32B 27/34* (2013.01); *B32B 27/36* (2013.01);
(Continued)

(58) Field of Classification Search
CPC ...... B29C 44/12; B29C 44/128; B29C 44/18; B32B 5/18; B32B 5/20; B32B 15/046; B32B 15/092; B32B 27/065; B32B 27/28; B32B 27/281; B32B 27/285; B32B 27/286; B32B 27/30; B32B 27/304; B32B 27/306; B32B 27/308; B32B 27/34; B32B 27/36; B32B 27/365; B32B 27/38; B32B 27/42; B32B 2266/0271
USPC ................................................ 156/79, 244.11
See application file for complete search history.

(56) References Cited

U.S. PATENT DOCUMENTS

| 625,559 A | 5/1899 | Keeler |
| 2,804,416 A * | 8/1957 | Phillipsen ..................... 428/336 |

(Continued)

FOREIGN PATENT DOCUMENTS

| CA | 2425414 A1 | 4/2002 |
| DE | 3838655 A1 | 5/1990 |

(Continued)

OTHER PUBLICATIONS

International Search Report and Written opinion dated May 24, 2011; for Corresponding PCT Application No. US 2011/027166 filed Mar. 4, 2011.

(Continued)

*Primary Examiner* — Michael Tolin
(74) *Attorney, Agent, or Firm* — The Dobrusin Law Firm, P.C.

(57) ABSTRACT

A composite laminate is formed from a structural foam and a reinforcement layer. The matched surface tensions of the structural foam and reinforcement layer result in increased bond strength between the structural foam and the reinforcement layer, thus providing for improved physical characteristics including improved lap shear and flexural strength.

8 Claims, 5 Drawing Sheets

(51) Int. Cl.

| | |
|---|---|
| *B29C 44/18* | (2006.01) |
| *B32B 27/06* | (2006.01) |
| *B32B 15/04* | (2006.01) |
| *B32B 15/092* | (2006.01) |
| *B32B 27/28* | (2006.01) |
| *B32B 27/30* | (2006.01) |
| *B32B 27/34* | (2006.01) |
| *B32B 27/36* | (2006.01) |
| *B32B 27/42* | (2006.01) |
| *B32B 5/18* | (2006.01) |
| *B32B 27/38* | (2006.01) |

(52) U.S. Cl.
CPC .............. *B32B 27/365* (2013.01); *B32B 27/38* (2013.01); *B32B 27/42* (2013.01); *B32B 2266/0271* (2013.01)

(56) References Cited

U.S. PATENT DOCUMENTS

| | | |
|---|---|---|
| 3,392,225 A | 7/1968 | Phelan |
| 3,485,282 A | 12/1969 | Lopez |
| 3,579,942 A | 5/1971 | Cole |
| 3,860,541 A | 1/1975 | Lehmann et al. |
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,138,462 A | 2/1979 | Procida et al. |
| 4,304,709 A | 12/1981 | Salee |
| 4,306,040 A | 12/1981 | Baer |
| 4,427,481 A | 1/1984 | Smith et al. |
| 4,495,324 A | 1/1985 | Chacko et al. |
| 4,536,436 A | 8/1985 | Maeko et al. |
| 4,538,380 A | 9/1985 | Colliander |
| 4,601,769 A | 7/1986 | DeHoff |
| 4,693,775 A | 9/1987 | Harrison et al. |
| 4,724,243 A | 2/1988 | Harrison et al. |
| 4,749,434 A | 6/1988 | Harrison |
| 4,769,166 A | 9/1988 | Harrison |
| 4,778,845 A | 10/1988 | Tschan et al. |
| 4,833,191 A | 5/1989 | Bushway et al. |
| 4,871,590 A | 10/1989 | Merz et al. |
| 4,898,630 A | 2/1990 | Kitoh et al. |
| 4,908,273 A | 3/1990 | Urech et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,074,913 A | 12/1991 | Trivett |
| 5,124,186 A | 6/1992 | Wycech |
| 5,164,472 A | 11/1992 | White et al. |
| 5,240,543 A | 8/1993 | Fetterhoff et al. |
| 5,266,133 A | 11/1993 | Hanley et al. |
| 5,274,006 A | 12/1993 | Kagoshima et al. |
| 5,275,853 A | 1/1994 | Silvis et al. |
| 5,342,873 A | 8/1994 | Merz et al. |
| 5,344,208 A | 9/1994 | Bien et al. |
| 5,382,606 A | 1/1995 | Butikofer |
| 5,401,814 A | 3/1995 | Schomaker et al. |
| 5,464,924 A | 11/1995 | Silvis et al. |
| 5,470,886 A | 11/1995 | Makhlouf et al. |
| 5,475,039 A | 12/1995 | Butikofer |
| 5,506,025 A | 4/1996 | Otto et al. |
| 5,575,526 A | 11/1996 | Wycech |
| 5,648,401 A | 7/1997 | Czaplicki et al. |
| 5,649,400 A | 7/1997 | Miwa |
| 5,708,042 A | 1/1998 | Hasegawa |
| 5,712,317 A | 1/1998 | Makhlouf et al. |
| 5,725,272 A | 3/1998 | Jones |
| 5,755,486 A | 5/1998 | Wycech |
| 5,766,719 A | 6/1998 | Rimkus |
| 5,783,272 A | 7/1998 | Wong |
| 5,834,078 A | 11/1998 | Cavitt et al. |
| 5,884,960 A | 3/1999 | Wycech |
| 5,894,071 A | 4/1999 | Merz et al. |
| 5,911,932 A | 6/1999 | Dyksterhouse |
| 5,931,474 A | 8/1999 | Chang et al. |
| 5,932,680 A | 8/1999 | Heider |
| 5,948,508 A | 9/1999 | Pastore et al. |
| 5,962,093 A | 10/1999 | White et al. |
| 5,964,979 A | 10/1999 | George et al. |
| 5,985,435 A | 11/1999 | Czaplicki et al. |
| 5,994,422 A | 11/1999 | Born et al. |
| 5,997,077 A | 12/1999 | Siebels et al. |
| 6,004,425 A | 12/1999 | Born et al. |
| 6,006,484 A | 12/1999 | Geissbuhler |
| 6,030,701 A | 2/2000 | Johnson et al. |
| 6,033,300 A | 3/2000 | Schneider |
| 6,040,350 A | 3/2000 | Fukui |
| 6,057,382 A | 5/2000 | Karim et al. |
| 6,068,922 A | 5/2000 | Vercesi et al. |
| 6,077,884 A | 6/2000 | Hess et al. |
| 6,093,358 A | 7/2000 | Schiewe et al. |
| 6,096,791 A | 8/2000 | Born et al. |
| 6,103,341 A | 8/2000 | Barz et al. |
| 6,103,784 A | 8/2000 | Hilborn et al. |
| 6,111,015 A | 8/2000 | Eldin et al. |
| 6,131,897 A | 10/2000 | Barz et al. |
| 6,133,335 A | 10/2000 | Mahoney et al. |
| 6,135,541 A | 10/2000 | Geise et al. |
| 6,136,398 A | 10/2000 | Willett et al. |
| 6,136,944 A | 10/2000 | Stewart et al. |
| 6,146,565 A | 11/2000 | Keller |
| 6,150,428 A | 11/2000 | Hanley et al. |
| 6,153,302 A | 11/2000 | Karim et al. |
| 6,162,504 A | 12/2000 | Hubert et al. |
| 6,174,932 B1 | 1/2001 | Pachl et al. |
| 6,180,715 B1 | 1/2001 | Schmidt |
| 6,218,442 B1 | 4/2001 | Hilborn et al. |
| 6,228,449 B1 | 5/2001 | Meyer |
| 6,232,433 B1 | 5/2001 | Narayan |
| 6,235,842 B1 | 5/2001 | Kuwano et al. |
| 6,263,635 B1 | 7/2001 | Czaplicki |
| 6,270,600 B1 | 8/2001 | Wycech |
| 6,277,898 B1 | 8/2001 | Pachl et al. |
| 6,281,260 B1 | 8/2001 | Hanley et al. |
| 6,287,666 B1 | 9/2001 | Wycech |
| 6,287,669 B1 | 9/2001 | George et al. |
| 6,296,298 B1 | 10/2001 | Barz |
| 6,303,672 B1 | 10/2001 | Papalos et al. |
| 6,311,452 B1 | 11/2001 | Barz et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,358,584 B1 | 3/2002 | Czaplicki |
| 6,368,438 B1 | 4/2002 | Chang et al. |
| 6,376,564 B1 | 4/2002 | Harrison |
| 6,382,635 B1 | 5/2002 | Fitzgerald |
| 6,383,610 B1 | 5/2002 | Barz et al. |
| 6,403,222 B1 | 6/2002 | Harrison |
| 6,413,611 B1 | 7/2002 | Roberts et al. |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,455,634 B1 | 9/2002 | Khandpur et al. |
| 6,467,834 B1 | 10/2002 | Barz et al. |
| 6,471,285 B1 | 10/2002 | Czaplicki et al. |
| 6,479,560 B2 | 11/2002 | Freitag et al. |

(56) References Cited

U.S. PATENT DOCUMENTS

| | | |
|---|---|---|
| 6,482,486 B1 | 11/2002 | Czaplicki et al. |
| 6,486,256 B1 | 11/2002 | Tarbutton et al. |
| 6,489,400 B2 | 12/2002 | Khandpur et al. |
| 6,506,494 B2 | 1/2003 | Brandys et al. |
| 6,546,693 B2 | 4/2003 | Wycech |
| 6,548,593 B2 | 4/2003 | Merz et al. |
| 6,561,571 B1 | 5/2003 | Brennecke |
| 6,573,309 B1 | 6/2003 | Reitenbach et al. |
| 6,586,089 B2 | 7/2003 | Golden |
| 6,589,621 B1 | 7/2003 | Beckerdite et al. |
| 6,593,380 B2 | 7/2003 | Gehlsen et al. |
| 6,607,831 B2 | 8/2003 | Ho et al. |
| 6,617,366 B2 | 9/2003 | Sueda et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,692,347 B1 | 2/2004 | Schneider |
| 6,706,772 B2 | 3/2004 | Czaplicki et al. |
| 6,706,802 B2 | 3/2004 | Carlson et al. |
| 6,722,720 B2 | 4/2004 | Donick et al. |
| 6,730,713 B2 | 5/2004 | Czaplicki |
| 6,740,067 B2 | 5/2004 | Leise et al. |
| 6,740,379 B1 | 5/2004 | Congard et al. |
| 6,740,399 B1 | 5/2004 | George et al. |
| 6,753,379 B1 | 6/2004 | Kawate et al. |
| 6,774,171 B2 | 8/2004 | Kassa et al. |
| 6,776,869 B1 | 8/2004 | Schenkel |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,820,923 B1 | 11/2004 | Bock |
| 6,824,451 B2 | 11/2004 | Hollatz et al. |
| 6,838,509 B2 | 1/2005 | Shimo et al. |
| 6,846,559 B2 | 1/2005 | Czalicki et al. |
| 6,884,854 B2 | 4/2005 | Schoenfeld et al. |
| 6,887,914 B2 | 5/2005 | Czalicki et al. |
| 6,890,964 B2 | 5/2005 | Czaplicki et al. |
| 6,894,082 B2 | 5/2005 | Brantl et al. |
| 6,911,109 B2 | 6/2005 | Giroux et al. |
| 6,920,693 B2 | 7/2005 | Hankins et al. |
| 6,955,593 B2 | 10/2005 | Lewis et al. |
| 6,991,237 B2 | 1/2006 | Kassa et al. |
| 7,008,680 B2 | 3/2006 | Everaerts et al. |
| 7,071,263 B2 | 7/2006 | Cheng et al. |
| 7,084,209 B2 | 8/2006 | Everaerts et al. |
| 7,084,210 B2 | 8/2006 | Eagle |
| 7,094,843 B2 | 8/2006 | Meyer |
| 7,119,149 B2 | 10/2006 | Ferguson et al. |
| 7,125,461 B2 | 10/2006 | Czaplicki et al. |
| 7,169,467 B2 | 1/2007 | Wilson |
| 7,199,165 B2 | 4/2007 | Kassa et al. |
| 7,249,415 B2 * | 7/2007 | Larsen et al. ................. 29/897.2 |
| 7,297,740 B2 | 11/2007 | Dyksterhouse |
| 7,318,873 B2 * | 1/2008 | Czaplicki et al. ............... 156/71 |
| 7,392,929 B1 | 7/2008 | Finerman et al. |
| 7,438,782 B2 | 10/2008 | Sheasley et al. |
| 7,467,452 B2 | 12/2008 | Lande et al. |
| 7,494,179 B2 | 2/2009 | Deachin et al. |
| 7,503,620 B2 | 3/2009 | Brennecke et al. |
| 7,892,396 B2 | 2/2011 | Sheasley |
| 7,926,179 B2 | 4/2011 | Gray et al. |
| 2002/0013389 A1 | 1/2002 | Taylor et al. |
| 2002/0123575 A1 | 9/2002 | Kato et al. |
| 2002/0164450 A1 | 11/2002 | Lupini et al. |
| 2002/0192387 A1 | 12/2002 | Agarwal et al. |
| 2003/0045620 A1 | 3/2003 | Carlson et al. |
| 2003/0050352 A1 | 3/2003 | Guenther et al. |
| 2003/0062739 A1 | 4/2003 | Bock |
| 2003/0132017 A1 | 7/2003 | Barioz |
| 2003/0162017 A1 * | 8/2003 | Weir et al. ..................... 428/354 |
| 2003/0183317 A1 | 10/2003 | Czaplicki et al. |
| 2003/0186049 A1 | 10/2003 | Czaplicki et al. |
| 2004/0011282 A1 | 1/2004 | Myers et al. |
| 2004/0048078 A1 | 3/2004 | Czaplicki et al. |
| 2004/0056472 A1 | 3/2004 | Schneider |
| 2004/0079478 A1 | 4/2004 | Merz |
| 2004/0180193 A1 | 9/2004 | Oda et al. |
| 2004/0181013 A1 | 9/2004 | Schenkel |
| 2004/0197545 A1 | 10/2004 | Gehlsen et al. |
| 2004/0204551 A1 | 10/2004 | Czaplicki et al. |
| 2004/0229000 A1 | 11/2004 | Khandpur et al. |
| 2004/0266898 A1 | 12/2004 | Kassa et al. |
| 2005/0016677 A1 | 1/2005 | Carlson et al. |
| 2005/0020703 A1 | 1/2005 | Czaplicki et al. |
| 2005/0081383 A1 | 4/2005 | Kosal et al. |
| 2005/0082111 A1 | 4/2005 | Weber |
| 2005/0103422 A1 | 5/2005 | Kawaguchi |
| 2005/0119372 A1 | 6/2005 | Czaplicki et al. |
| 2005/0154089 A1 | 7/2005 | Taylor et al. |
| 2005/0159511 A1 | 7/2005 | Kramer |
| 2005/0159531 A1 | 7/2005 | Ferng et al. |
| 2005/0172486 A1 | 8/2005 | Carlson et al. |
| 2005/0221046 A1 | 10/2005 | Finerman et al. |
| 2005/0230027 A1 | 10/2005 | Kassa et al. |
| 2005/0230165 A1 | 10/2005 | Thomas et al. |
| 2005/0241756 A1 | 11/2005 | Harthcock et al. |
| 2005/0249936 A1 | 11/2005 | Ui et al. |
| 2005/0279567 A1 | 12/2005 | Ito |
| 2006/0019595 A1 | 1/2006 | Lewis et al. |
| 2006/0021697 A1 | 2/2006 | Riley et al. |
| 2006/0057333 A1 | 3/2006 | Brahim |
| 2006/0065483 A1 | 3/2006 | Thomas |
| 2006/0090343 A1 | 5/2006 | Riley et al. |
| 2006/0124386 A1 | 6/2006 | Helferty |
| 2006/0155045 A1 | 7/2006 | Tsuno et al. |
| 2006/0171269 A1 | 8/2006 | Hiramatsu et al. |
| 2006/0188726 A1 | 8/2006 | Muenz et al. |
| 2006/0252860 A1 | 11/2006 | Ui et al. |
| 2007/0045042 A1 | 3/2007 | Barz et al. |
| 2007/0087848 A1 | 4/2007 | Larsen et al. |
| 2007/0088138 A1 | 4/2007 | Czaplicki et al. |
| 2007/0090560 A1 | 4/2007 | Kassa et al. |
| 2007/0095475 A1 | 5/2007 | Hable |
| 2007/0101679 A1 | 5/2007 | Harthcock et al. |
| 2007/0116961 A1 | 5/2007 | Connell et al. |
| 2007/0117874 A1 | 5/2007 | Kassa et al. |
| 2007/0122510 A1 | 5/2007 | Mendiboure et al. |
| 2007/0134058 A1 | 6/2007 | Meyer et al. |
| 2007/0138683 A1 | 6/2007 | Kanie et al. |
| 2007/0264438 A1 | 11/2007 | Kawai |
| 2007/0284036 A1 | 12/2007 | Sheasley |
| 2008/0029200 A1 | 2/2008 | Sheasley |
| 2008/0029214 A1 | 2/2008 | Hable et al. |
| 2008/0060742 A1 | 3/2008 | Sheasley et al. |
| 2008/0241576 A1 | 10/2008 | Le Gall et al. |
| 2008/0311405 A1 | 12/2008 | Wang et al. |
| 2009/0269547 A1 | 10/2009 | Meyer et al. |
| 2010/0025147 A1 | 2/2010 | Kassa |
| 2011/0098382 A1 | 4/2011 | Czaplicki |
| 2011/0220267 A1 | 9/2011 | Blancaneaux |
| 2012/0186721 A1 | 7/2012 | Preghenella |

FOREIGN PATENT DOCUMENTS

| | | |
|---|---|---|
| DE | 19919783 A1 | 11/2000 |
| EP | 0360214 A2 | 3/1990 |
| EP | 0383498 A2 | 8/1990 |
| EP | 0442178 A1 | 8/1991 |
| EP | 0710696 A2 | 5/1996 |
| EP | 0730999 A1 | 9/1996 |
| EP | 0819723 A1 | 1/1998 |
| EP | 0893332 A1 | 1/1999 |

(56) References Cited

FOREIGN PATENT DOCUMENTS

| | | |
|---|---|---|
| EP | 1022320 A1 | 7/2000 |
| EP | 1055699 A1 | 11/2000 |
| EP | 1072647 A2 | 1/2001 |
| EP | 1122152 A2 | 8/2001 |
| EP | 1123348 A2 | 8/2001 |
| EP | 1149679 A2 | 10/2001 |
| EP | 1031496 B1 | 12/2001 |
| EP | 1182087 A2 | 2/2002 |
| EP | 0703931 B1 | 10/2003 |
| EP | 1362683 A2 | 11/2003 |
| EP | 1240266 B1 | 2/2004 |
| EP | 0851894 B1 | 4/2004 |
| EP | 1272587 B1 | 5/2004 |
| EP | 1155084 B1 | 6/2004 |
| EP | 1431325 A1 | 6/2004 |
| EP | 1075498 B1 | 7/2004 |
| EP | 0820491 B1 | 8/2004 |
| EP | 0947529 B1 | 8/2004 |
| EP | 1185595 A2 | 8/2004 |
| EP | 1252217 B1 | 8/2004 |
| EP | 1449868 A1 | 8/2004 |
| EP | 1023413 B1 | 9/2004 |
| EP | 1155082 B1 | 9/2004 |
| EP | 1305376 B1 | 9/2004 |
| EP | 1155053 B1 | 10/2004 |
| EP | 1163308 B1 | 10/2004 |
| EP | 1471105 A2 | 10/2004 |
| EP | 1001893 B1 | 11/2004 |
| EP | 1115770 B1 | 11/2004 |
| EP | 1187888 B1 | 11/2004 |
| EP | 1134126 B1 | 12/2004 |
| EP | 1591224 A1 | 2/2005 |
| EP | 1574537 A1 | 9/2005 |
| EP | 1157916 B1 | 10/2005 |
| EP | 1123348 B1 | 12/2005 |
| EP | 1602702 A1 | 12/2005 |
| EP | 1458594 B1 | 3/2006 |
| EP | 1666228 A2 | 6/2006 |
| EP | 1506265 B1 | 7/2006 |
| EP | 1578838 B1 | 8/2006 |
| EP | 1609831 B1 | 8/2006 |
| EP | 1453925 B1 | 10/2006 |
| GB | 903146 A | 8/1962 |
| JP | 55-16073 A | 4/1980 |
| JP | 56-004432 A | 1/1981 |
| JP | 57-117542 A | 7/1982 |
| JP | 60-096681 A | 5/1985 |
| JP | 62-062882 A | 3/1987 |
| JP | 04-059819 A | 2/1992 |
| JP | 09-176616 A | 7/1997 |
| JP | 09-249730 A | 9/1997 |
| JP | 09-0316169 A | 12/1997 |
| JP | 10-045031 A | 2/1998 |
| JP | 11-106544 A | 4/1999 |
| JP | 2001-62833 A | 3/2001 |
| JP | 2001191949 A | 7/2001 |
| JP | 2002-362412 A | 12/2002 |
| JP | 2004315688 A | 11/2004 |
| JP | 2005187508 A | 7/2005 |
| WO | 95/25005 | 9/1995 |
| WO | 95/33785 A1 | 12/1995 |
| WO | 97/02967 A1 | 1/1997 |
| WO | 97/12929 A1 | 4/1997 |
| WO | 97/19743 A1 | 5/1997 |
| WO | 98/36844 | 8/1998 |
| WO | 98/36944 A1 | 8/1998 |
| WO | 98/52997 A1 | 11/1998 |
| WO | 98/53008 A1 | 11/1998 |
| WO | 99/02578 A1 | 1/1999 |
| WO | 00/03894 A1 | 1/2000 |
| WO | 00/12571 A1 | 3/2000 |
| WO | 00/12595 A1 | 3/2000 |
| WO | 00/13876 A1 | 3/2000 |
| WO | 00/20483 A2 | 4/2000 |
| WO | 00/27920 A1 | 5/2000 |
| WO | 00/37242 A1 | 6/2000 |
| WO | 00/37554 A1 | 6/2000 |
| WO | 00/39232 A1 | 7/2000 |
| WO | 00/40629 A1 | 7/2000 |
| WO | 00/46017 | 8/2000 |
| WO | 00/52086 A2 | 9/2000 |
| WO | 01/19667 A1 | 3/2001 |
| WO | 01/57130 A1 | 8/2001 |
| WO | 01/71225 A1 | 9/2001 |
| WO | 01/88033 A1 | 11/2001 |
| WO | 02/070620 A1 | 9/2002 |
| WO | 02/088214 A1 | 11/2002 |
| WO | 03/011954 A1 | 2/2003 |
| WO | 03/040251 A1 | 5/2003 |
| WO | 03/051676 A1 | 6/2003 |
| WO | 03/054069 A1 | 7/2003 |
| WO | 03/058340 A1 | 7/2003 |
| WO | 03/059997 A1 | 7/2003 |
| WO | 03/072677 A1 | 9/2003 |
| WO | 03/078163 A1 | 9/2003 |
| WO | 03/095575 A1 | 11/2003 |
| WO | 2004/050740 A1 | 6/2004 |
| WO | 2004/055092 A1 | 7/2004 |
| WO | 2004/060956 A1 | 7/2004 |
| WO | 2004/060984 A1 | 7/2004 |
| WO | 2004/062869 A2 | 7/2004 |
| WO | 2004/065485 A1 | 8/2004 |
| WO | 2004/076507 A2 | 9/2004 |
| WO | 2004/085510 A1 | 10/2004 |
| WO | 2004/085564 A1 | 10/2004 |
| WO | 2004/099312 A1 | 11/2004 |
| WO | 2005/002950 A2 | 1/2005 |
| WO | 2005/007720 A1 | 1/2005 |
| WO | 2005/044630 A1 | 5/2005 |
| WO | 2005/047393 A1 | 5/2005 |
| WO | 2005/090431 A1 | 9/2005 |
| WO | 2005/090455 A1 | 9/2005 |
| WO | 2005/095484 A1 | 10/2005 |
| WO | 2005/105405 A1 | 11/2005 |
| WO | 2005/108456 A1 | 11/2005 |
| WO | 2005/113627 A1 | 12/2005 |
| WO | 2006/074394 A2 | 7/2006 |
| WO | 2006/131190 A1 | 12/2006 |
| WO | 2007/050658 A1 | 5/2007 |
| WO | 2008/014053 A2 | 1/2008 |
| WO | 2009/124709 A1 | 10/2009 |
| WO | 2011/012997 A2 | 2/2011 |
| WO | 2011/109699 A1 | 9/2011 |

OTHER PUBLICATIONS

Corresponding PCT Application No. US 2011/027166 filed Mar. 4, 2011; Published as WO 2011/109699 or Sep. 9, 2011.
*The Epoxy Book* Published by System Three Resins, Inc. Seattle, Washington.
"Epoxy Resins" Second Edition Encyclopedia of Polymer Science and Engineering, vol. 6, pp. 322-382 (1985).
Born et al. "Structural Bonding in Automotive Applications".
Dvorko. "One-Part Epoxy Compounds and Derived Foam Plastics", published Apr. 13, 2004.
Zalobsky et al., "Recommendations on Selection and Use of Cavity Reinforcement Materials" Proceedings of the 1999 Noise and Vibration Conference.
Weber et al., "Characterizing the in Vehicle Performance of Expandable Sealants Used As Acoustic Baffles", Proceedings of the 1999 Noise and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy Foam for Structural and Crash Application". 2004 SAE World Congress, Mar. 8-11, 2004.
Schulenburg et al., "Structural Adhesives—Improvements in Vehicle Crash Performance", 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
Lilley et al., Vehicle Acoustic Solutions.

(56) References Cited

OTHER PUBLICATIONS

Co-pending U.S. Appl. No. 10/718,509, filed Nov. 20, 2003.
Co-pending U.S. Appl. No. 60/753,973, filed Dec. 23, 2005.
Co-pending U.S. Appl. No. 60/746,810, filed May 9, 2006.
Co-pending U.S. Appl. No. 60/747,677, filed May 19, 2006.
Co-pending U.S. Appl. No. 60/804,117, filed Jun. 7, 2006.
Co-pending U.S. Appl. No. 60/820,295, filed Jul. 25, 2006.
Related Patent Application No. PCT/US04/20112, filed Jun. 23, 2004; Published as WO 2005/002950 on Jan. 13, 2005.
Opposition for European Patent No. 1790554B1; Dated Jun. 20, 2012.
Original Opposition Notice dated Mar. 7, 2012.
Opposition for European Patent No. 1790554 (translation).
Chinese Office Action dated Apr. 28, 2014; Appln. No. 2011800225809.
English Translation of Chinese Second Office Action for Chinese Application No. 2011800225809, dated Dec. 25, 2014.
Japanese Office Action for Japanese Application No. 2012-556261, dated Mar. 27, 2015.

* cited by examiner

STRUCTURAL COMPOSITE LAMINATES

CLAIM OF PRIORITY

The present application claims the benefit of the filing date of U.S. Provisional Application No. 61/310,580 (filed Mar. 4, 2010), the entirety of the contents of that application being hereby expressly incorporated by reference.

FIELD OF THE INVENTION

The present invention relates generally to laminate structures for sealing, baffling and structural reinforcement. More specifically, the present invention relates to laminate structures including structural foam and carrier materials.

BACKGROUND OF THE INVENTION

Structural reinforcement of vehicle cavities is commonly achieved by molding polymeric carriers into specific shapes that reflect the contours of the cavity requiring reinforcement, and locating expandable foam materials onto certain surfaces of the carriers. Thus, each carrier must be customized to a particular shape which requires the formation and use of multiple molds and further requires injection molding processes that are both time-consuming and costly. Many carriers require overmolding or multi-shot injection molding in order be formed in the correct shape and with sufficient density for reinforcing purposes. In attempts to reduce the cost and effort associated with manufacture of the carriers, attempts have been made to provide expandable foam materials without the inclusion of a carrier, as structural foams. The benefit is that that the size and shape of the structural foam can be quickly modified and customized to any necessary shape. Unfortunately, without a carrier, the strength of the reinforcement member that includes only the structural foam is reduced. Further, without a carrier it is difficult to control the expansion of the structural foam. It is thus desirable to provide a reinforcing structure that has the customization benefits of a structural foam alone, but still provides the requisite strength for cavity reinforcement. It is further desirable that the carrier add minimal weight and cost to the resulting structure, but still provide improved strength and reinforcement ability than would be realized from either the structural foam or the carrier alone.

SUMMARY OF THE INVENTION

The present invention meets some or all of the above needs by providing a composite laminate structure having a reinforcement layer and structural foam so that the bond formed between the reinforcement layer and structural foam provides strength that exceeds that of the either, the structural foam or reinforcement layer alone. The present invention is directed toward a method of forming a composite laminate for providing sealing, baffling or reinforcement to a structure by providing a reinforcement layer and locating an epoxy-based expandable structural foam thereon. The reinforcement layer may have a surface tension of at least about 35 dynes/cm. The surface tensions of the structural foam and reinforcement layer are within about 15 dynes/cm of one another. The surface tensions of the reinforcement layer and structural foam provide sufficient wetting for load transfer from the structural foam to the reinforcement layer to increase the tensile strength of the composite laminate and to increase the lap shear strength of the composite laminate.

The present invention is further directed toward a composite laminate for providing sealing, baffling or reinforcement to a structure that includes a reinforcement layer and an epoxy-based expandable structural foam. The reinforcement layer may have a surface tension of at least about 35 dynes/cm. The epoxy-based expandable structural foam material is located onto the reinforcement layer to form the composite laminate. The surface tensions of the structural foam and reinforcement layer are within about 15 dynes/cm of one another so that adhesion between the structural foam and reinforcement layer is improved.

The present invention is also directed toward a method of forming a composite laminate by providing a polymeric reinforcement layer and locating an epoxy-based expandable structural foam material onto the reinforcement layer by a co-extrusion process to form the composite laminate. The composite laminate is then exposed to a temperature greater than 150° C. The reinforcement layer has a surface tension of at least about 35 dynes/cm and may include at least one chemical functional group free to react, such as a carboxylic acid or a primary or secondary amine. The structural foam may include an epoxy resin, an epoxy/elastomer adduct including about 1:3 to 3:1 parts of epoxy to elastomer, and a core/shell polymer impact modifier. The epoxy resin may form a covalent bond with the reinforcement, such as with the carboxylic acid or amine of the reinforcement layer, upon exposure to temperatures greater than 150° C. The covalent bond allows for load transfer from the structural foam to the reinforcement layer to increase the tensile strength of the composite laminate.

The composite laminate includes improved physical properties over existing structures and materials for use in the sealing, baffling and reinforcement of cavities. These improved physical properties may include but are not limited to increased vertical rise, improved lap shear strength, increased tensile and flexural properties and increased T-Peel strength as compared to the use of structural foams alone. The structures of the present invention may also have improved storage and transport stability and improved shelf-life. The structures disclosed herein may also allow for customization of the size, shape and foam expansion direction of the structures in that the carrier is easily manipulated. In addition, the presence of the carrier allows for improved control over the expansion of the structural foam as compared to uses of structural foam alone.

DETAILED DESCRIPTION

Figure 1:
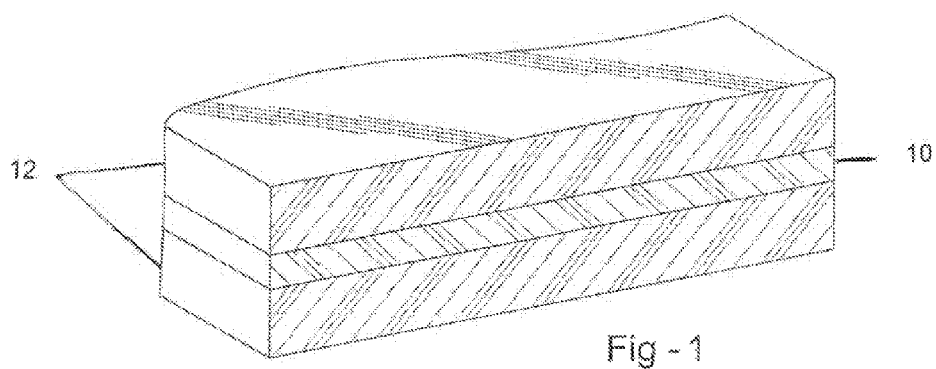
FIG. 1 is a cross-sectional view of an illustrative laminate structure in accordance with the present teachings.

In general, the teachings herein provide for a laminate structure that includes at least a reinforcement layer and a structural foam material located thereon. As an example, FIG. 1 shows a composite laminate having a reinforcement layer 10 and a structural foam layers 12 located on both surfaces of the reinforcement layer. The reinforcement layer provides a support mechanism for the structural foam material whereby a bond is formed between the reinforcement layer and the structural foam so that load transfer occurs from the structural foam to the reinforcement layer. The surface tensions of both the reinforcement layer and the structural foam may be similar (e.g., matched) so that the bond between the reinforcement layer and structural foam is strengthened. The strengthened bond between the reinforcement layer and the structural foam results in the laminate having one or more of improved peel strength, improved tensile properties, improved lap shear properties, improved compression properties, increased vertical rise, and improved flexural properties.

The bond between the reinforcement layer and structural foam may be formed by a variety of processes. As an example, the surface tension of the reinforcement layer and the surface tension of the structural foam may be matched so that bonding between the reinforcement layer and structural foam is improved. Improved bonding is observed as ease of wetting increases. The exceptional mechanical and structural properties exhibited by the present invention require increased adhesion of the structural foam to the reinforcement layer so that load placed on the resulting composite laminate can be transferred from the adhesive to the reinforcement layer to support part of or substantially all of the load. Thus, one technique relied upon to ensure improved adhesion is through matching the surface tensions of the adhesive and the reinforcement layer so that wetting is improved.

In order to achieve the improved bond strength between the structural foam and reinforcement layer, the surface tension of both the reinforcement layer and the structural foam may be at least about 35 dynes/cm. The surface tension of both the reinforcement layer and structural foam may be less than about 80 dynes/cm. In the event that the surface tension of the reinforcement layer falls below 35 dynes/cm, the reinforcement layer may be treated to increase its surface tension. Even when the surface tension of the reinforcement layer is at or above 35 dynes/cm, the reinforcement layer may still be treated to modify its surface tension to match the surface tension of the structural foam. Methods for treating the reinforcement layer to modify its surface tension are described herein. As an example, the structural foam may include an epoxy resin that provides for a surface tension of about 47 dynes/cm. Thus, for improved bond strength with the structural foam, the reinforcement layer has a surface tension of at least about 38 dynes/cm, but preferably at least about 42 dynes/cm, or greater.

The structural foam preferably includes an epoxy resin. Epoxy resin is used herein to mean any of the conventional dimeric, oligomeric or polymeric epoxy materials containing at least one epoxy functional group. The epoxy resin may be a bisphenol-A epoxy resin. The epoxy resin may comprise from about 2% to about 80% by weight of the structural foam. The epoxy resin may comprise from about 10% to about 30% by weight of the structural foam. The epoxy resin may comprise at least about 10% by weight of the structural foam. The epoxy resin may comprise less than about 30% by weight of the structural foam. The epoxy resin may be a liquid or a solid epoxy resin or may be a combination of liquid and solid epoxy resins.

The structural foam may also include an epoxy/elastomer adduct. More specifically, the adduct is composed substantially entirely (i.e., at least 70%, 80%, 90% or more) of one or more adducts that are solid at a temperature of 23° C. The adduct may comprise from about 5% to about 80% by weight of the structural foam. The adduct may comprise at least about 5% by weight of the structural foam. The adduct may comprise at least about 10% by weight of the structural foam. The adduct may comprise less than about 70% by weight of the structural foam. The adduct may comprise less than about 30% by weight of the structural foam. The adduct itself generally includes about 1:5 to 5:1 parts of epoxy to elastomer, and more preferably about 1:3 to 3:1 parts or epoxy to elastomer. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile (CTBN)), butyl rubber, polysulfide elastomer, acrylic elastomer, acrylonitrile elastomers, silicone rubber, polysiloxanes, polyester rubber, diisocyanate linked condensation elastomer, EPDM (ethylene-propylene diene rubbers), chlorosulphonated polyethylene, fluorinated hydrocarbons and the like. Examples of additional or alternative epoxy/elastomer or other adducts suitable for use in the present invention are disclosed in U.S. Patent Publication 2004/0204551, which is incorporated herein by reference for all purposes. As a specific example, the structural foam may include from about 5% to about 20% by weight CTBN/epoxy adduct.

The structural foam may also include an impact modifier. The impact modifier may comprise at least about 4% by weight of the structural foam. The impact modifier may comprise at least about 10% by weight of the structural foam. The impact modifier may comprise at least about 17% by weight of the structural foam. The impact modifier may comprise less than about 40% by weight of the structural foam. The impact modifier may comprise from about 2% to about 60% by weight of the structural foam.

The impact modifier may include at least one core/shell polymer. As used herein, the term core/shell polymer describes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like. It may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto cores made from polymers of soft or elastomeric containing compounds such as butadiene or butyl acrylate. U.S. Pat. No. 3,985,703, which is herein incorporated by reference, describes useful core-shell polymers, the cores of which are made from butyl acrylate but can be based on ethyl isobutyl, 2-ethylhexyl or other alkyl acrylates or mixtures thereof. The core polymer, may also include other copolymerizable containing compounds, such as styrene, vinyl acetate, methyl methacrylate, butadiene, isoprene, or the like. The shell portion may be polymerized from methyl methacrylate and optionally other alkyl methacrylates, such as ethyl, butyl, or mixtures thereof methacrylates. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The structural foam may also include one or more additional polymer and/or copolymer materials, such as thermoplastics, elastomers, plastomers, combinations thereof or the like. Polymers that might be appropriately incorporated into the structural foam include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly (ethyleneimine), polyester, polyurethane, polysiloxane, polyether, polyphosphazine, polyamide, polyimide, polyisobutylene, polyacrylonitrile, poly(vinyl chloride), poly (methyl methacrylate), poly(vinyl acetate), poly(vinylidene chloride), polytetrafluoroethylene, polyisoprene, polyacrylamide, polyacrylic acid, polymethacrylate.

As a specific example, the structural foam may include at least about 2% but less than about 15% of a thermoplastic polyether. The structural foam may include at least about 10% by weight polyvinyl chloride. The structural foam may include less than about 30% by weight polyvinyl chloride. The structural foam may include at least about 0.1% by weight and less than about 5% by weight polyethylene oxide. The structural foam may include at least about 1% by weight of an ethylene copolymer (which may be and EVA or EMA copolymer). The structural foam may include at least about 15% by weight of an ethylene copolymer. The structural foam may include less than about 40% by weight of an ethylene copolymer. The structural foam may include at least about 5% by weight acrylonitrile. The structural foam may include at least about 20% by weight acrylonitrile. The structural foam may include less than about 50% by weight acrylonitrile.

The structural foam may also include a variety of blowing agents, curing agents and fillers. Examples of suitable blowing agents include azodicarbonamide, dinitrosopentamethylenetetramine, 4,4,-oxy-bis-(benzenesulphonylhydrazide), trihydrazinotriazine and N,N,-dimethyl-N,N,-dinitrosoterephthalamide. An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Examples of suitable curing agents include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the structural foam.

Examples of suitable fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed. One or more mineral or stone type fillers such as calcium carbonate, sodium carbonate or the like may be used as fillers. In another preferred embodiment, silicate minerals such as mica may be used as fillers. Preferably the filler includes a material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of materials that may be included as the structural foam include those disclosed in U.S. Pat. Nos. 7,892,396 and 7,125,461; and U.S. Application Nos. 2004/0204551; 2007/0090560; 2007/0101679; 2008/0060742; and 2009/0269547, which are incorporated by reference herein for all purposes.

The reinforcement layer includes any substantially solid material having the requisite capability to bond to the structural foam. As previously mentioned, the surface tension of the reinforcement layer is preferably at or above 35 dynes/cm and is also matched (e.g., similar to) the surface tension of the structural foam. Materials having surface tensions below this threshold (or considerably higher than that of the structural foam) may also be utilized as the reinforcement layer, but must first be treated to modify the surface tension of the material.

Polymeric materials may be used as the reinforcement layer. Certain polymeric materials have surface tension values that correspond with the surface tension of the epoxy-based materials generally utilized for the structural foam. Examples of polymeric materials that may be used as the reinforcement layer (with no treatment steps to modify surface tension) may include, but are not limited to acetals (about 47 dynes/cm), acrylics (about 41 dynes/cm), polyamides (about 41 dynes/cm), polycarbonates (about 46 dynes/cm), thermoplastic or cured thermoset epoxies (about 46 dynes/cm), polyethylene terephthalate (about 43 dynes/cm), polyimides (about 40 dynes/cm), polysulfones (about 41 dynes/cm), polyvinyl chlorides (about 39 dynes/cm) and phenolics (about 52 dynes/cm). Polyamides and polyethylene terephthalate (PET film) are two preferred materials for the reinforcement layer.

The reinforcement layer may include metal materials such as aluminum, steel, magnesium, tin, iron, nickel, copper, titanium or the like. The reinforcement layer may be a combination of different metal materials.

Those materials that have critical surface tensions which fall below 38 dynes/cm, may still be used as a reinforcement layer for this invention if they can be modified to meet the surface tension requirement. Three common methods for modifying the surface tension of a substrate are: (1) applying a liquid primer (including the use of strong acids and/or bases); (2) corona discharge; and (3) flaming with a petroleum based gas and air mixture. These methods typically succeed by oxidizing the surface of the substrate, thus raising its surface tension.

Another mechanism that ensures improved adhesion between the structural foam and the reinforcement layer is covalent bonding. Covalent bonding occurs via a chemical reaction between the reinforcement layer and structural foam. The composite laminate may require exposure to elevated temperatures (e.g., temperatures exceeding 150° C.) in order for the covalent bonds to form. Thus, during manufacture of the composite laminate (e.g., during a co-extrusion process), temperatures are not typically elevated to levels required for covalent bonds to form. However, the covalent bonds may form during a vehicle paint bake cycle when a vehicle is exposed to such elevated temperatures.

In addition to appropriate time and temperature exposure, a chemical reaction leading to covalent bonds requires appropriate chemical matches between the structural foam and reinforcement layer. The structural foam itself is a multi-component compound whose active ingredients include epoxy resins of various molecular weights. The epoxy resins may be based on diglycidyl ether of bisphenol A (DGBA) and their general chemical structure can be represented by:

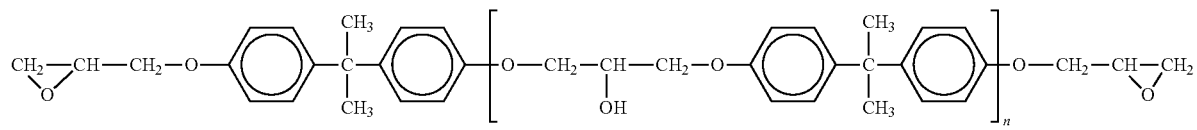

The functional components of the epoxy resins are the epoxide group (e.g., an oxirane ring), which reside at the ends of the epoxy resin molecules. Epoxy resins residing in the structural foam adhesive have epoxy equivalent weights in the range of 170 to 6000 g/eq, but more likely in the range of 170 to 2000 g/eq and most ideally in the range of 180 to 1000 g/eq. Therefore, in order to form a bond between a structural foam and the reinforcement layer, the reinforcement layer must contain chemical functional groups which will react with epoxy resins. Examples of chemical functional groups which will react with epoxides include hydroxyl, carboxylic acid, amine, isocyanate and anhydride groups. Many thermoplastics contain one or more of these groups, especially if they have been constructed through condensation polymerizations. Examples of condensation thermoplastics are polyamides, polyesters, polycarbonates and polyurethanes.

The reinforcement layer may comprise a thermoplastic film that contains the chemical functional group which may result in covalent chemical bonds following a final bake cycle of the composite laminate. Films available commercially are commonly made from condensation polymers, such as polyesters (e.g. Mylar), polyamides (Nylons) and polycarbonates.

In the event that a polyester film is utilized as the reinforcement layer, a polyester/epoxy bond may be formed. When the composite laminate's reinforcing layer is a polyester such as polyethylene terephthalate, chemical reactions necessary to form the covalent bonds may take place upon exposure to elevated temperatures. In general, polyester resins are high molecular weight condensation polymers which are chain terminated with both carboxylic acid and alcohol chemical functionality.

As an example, polyesters that are commonly converted in to film are polyethylene terephthalate (PET) and polybutylene terephthalate (PBT). In both cases the polymers are end-capped with both an alcohol and carboxylic acid. The reaction of the epoxide group with a carboxylic acid on the end of a polyester, such as polyethylene terephthalate (shown below as "PET"), proceeds via:

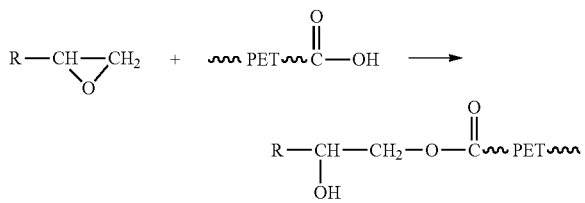

The reaction of the epoxide group with an alcohol on the end of a polyester, such as polyethylene terephthalate (shown below as "PET"), proceeds via:

-continued
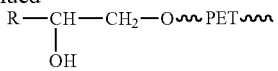

Similar to the epoxide/polyester reactions shown above, the composite laminate's reinforcing layer may be a polyamide (PA), (e.g., Nylon (polyamide-6 (PA-6)) and thus may result in an epoxide/polyamide reaction. Generally, polyamides are high molecular weight condensation polymers which are chain terminated with both carboxylic acid and primary amine chemical functionality. These polymers are often end-capped with both a primary amine and carboxylic acid. The reaction of an epoxide group with a carboxylic acid on the end of a polyamide such as PA-6, proceeds in the same manner as shown above for the polyester. The reaction of an epoxide group with a primary amine of a polyamide (shown below as "PA") proceeds according to:

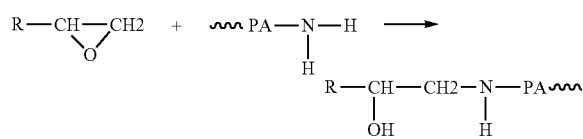

In both of the epoxide/polyester and epoxide/polyamide reactions shown above, a covalent bond is formed between the epoxy of the structural foam and the carboxylic acid, alcohol, or amine of the reinforcement layer. The resulting composite laminate exhibits the improved physical characteristics identified herein based upon the strength of the bond between the reinforcement layer and structural foam. The increased bond strength between the reinforcement layer and structural foam results in a number of improved physical characteristics of the composite laminate. Data depicting those improvements is shown below. Various examples of structural foams have been utilized to obtain the data, those structural foams being identified as having the compositions shown at Table 1.

TABLE 1

| Ingredient | Wt. % | | | |
|---|---|---|---|---|
| | A | B | C | D |
| Epoxy/Elastomer Adduct | 15.70 | 15.58 | 15.58 | 14.71 |
| Epoxidized Ethylene Copolymer | 1.95 | 1.93 | 1.93 | 1.74 |
| Ethylene Methacrylate | 1.95 | 1.93 | 1.93 | 8.03 |
| Filler | 43.1 | 46.56 | 43.09 | 50.93 |
| Epoxy Resins (solid-liquid mixture) | 17.05 | 14.21 | 16.71 | 9.00 |
| Multifunctional Phenolic Novalac Epoxy Resin | 2.93 | 2.94 | 2.94 | 3.59 |
| Curing Agent and/or Accelerator | 2.20 | 2.06 | 2.27 | 3.23 |
| Impact Modifier | 14.1 | 13.98 | 13.98 | 7.36 |
| Blowing Agent | 0.88 | 0.65 | 1.53 | 1.21 |
| Pigment | 0.15 | 0.15 | 0.025 | 0.2 |

Figure 2:
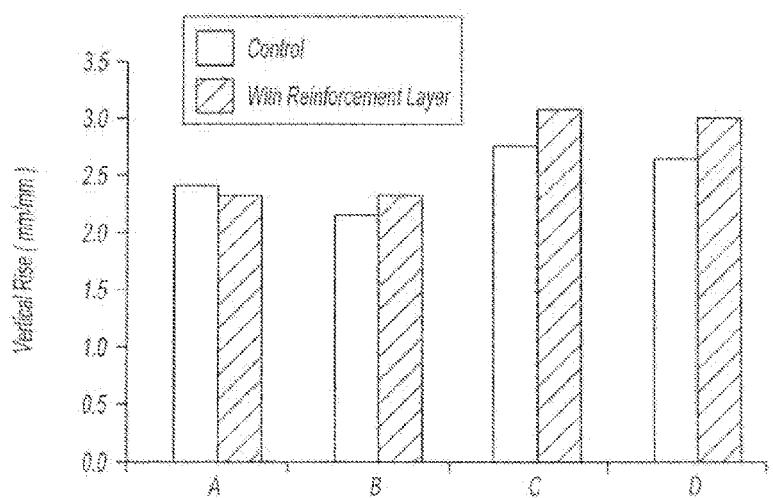
FIG. 2 shows a graphic representation of the vertical rise of structural foams A, B, C, and D shown with and without a reinforcement layer.

The improved bond between the reinforcement layer and structural foam results in improved characteristics that include an increased vertical rise during expansion of the structural foam. Vertical rise is defined as the thickness of the structural foam upon expansion as compared to the thickness of the structural foam prior to expansion. The reinforcement layer acts to restrict the lateral expansion of the structural foam which results in more controlled expansion direction and increased vertical rise. An increase in the vertical rise coupled with controlled expansion improves the reinforcing capability of the composite laminate by providing more precise contact of the structural foam with a cavity wall and increasing the density of the structural foam upon expansion. FIG. 2 includes a graphic representation of the vertical rise of structural foams A, B, C, and D shown both with and without a reinforcement layer.

Figure 3:
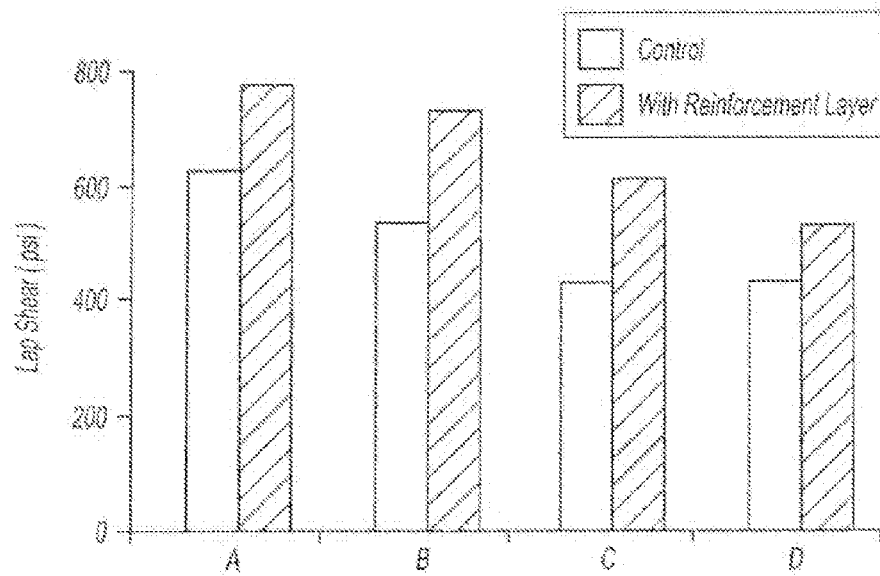
FIG. 3 shows a graphic representation of the lap shear strength of structural foams A, B, C, and D shown with and without a reinforcement layer.

The improved bond between the reinforcement layer and structural foam also results in improved lap shear strength when comparing structural foams without a reinforcement layer to those including a reinforcement layer. Increased lap shear strength results in improved reinforcing capabilities by increasing the overall strength of the composite laminate. Lap shear strength of structural foams is generally directly related to volume expansion, such that lower foam density (higher expansion) results in lower lap shear strength, and to bond-line, such that smaller bond lines lead to higher lap shear strengths. The bond-line can be defined as the bonding gap or the distance between two surfaces that an adhesive is bonding together. The improvement in lap shear strength gained from the present invention over structural foams without a reinforcement layer can be attributed to an increase in foam density, but more significantly from the reinforcing layer effectively reducing the bond-line by half. FIG. 3 includes a graphic representation of the lap shear stress of structural foams A, B, C, and D shown with and without a reinforcement layer. Table 2 below includes numerical results for vertical rise and lap shear stress.

TABLE 2

| | Vertical Rise | | Lap Shear Stress | | | |
|---|---|---|---|---|---|---|
| | ctrl | w/ reinf. | ctrl | | w/ reinf. | |
| Material | mm/mm | mm/mm | MPa | psi | MPa | psi |
| A | 2.42 | 2.34 | 4.32 | 627 | 5.33 | 773 |
| B | 2.16 | 2.34 | 3.68 | 534 | 5.03 | 730 |
| C | 2.77 | 3.10 | 2.97 | 431 | 4.21 | 611 |
| D | 2.66 | 3.02 | 2.99 | 434 | 3.67 | 532 |

Figure 4:
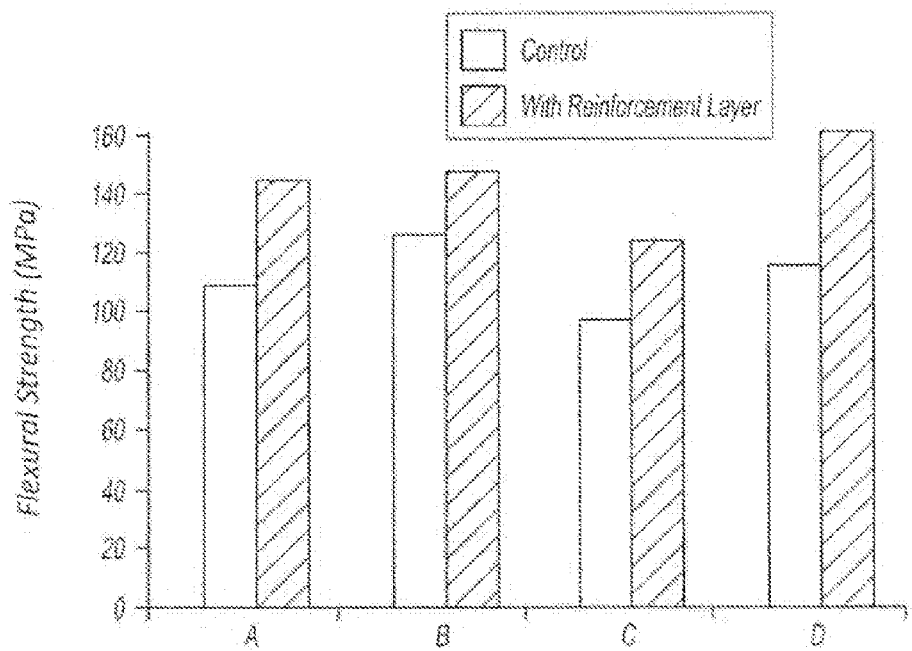
FIG. 4 shows a graphic representation of the flexural strength of structural foams A, B, C, and D shown with and without a reinforcement layer.
Figure 5:
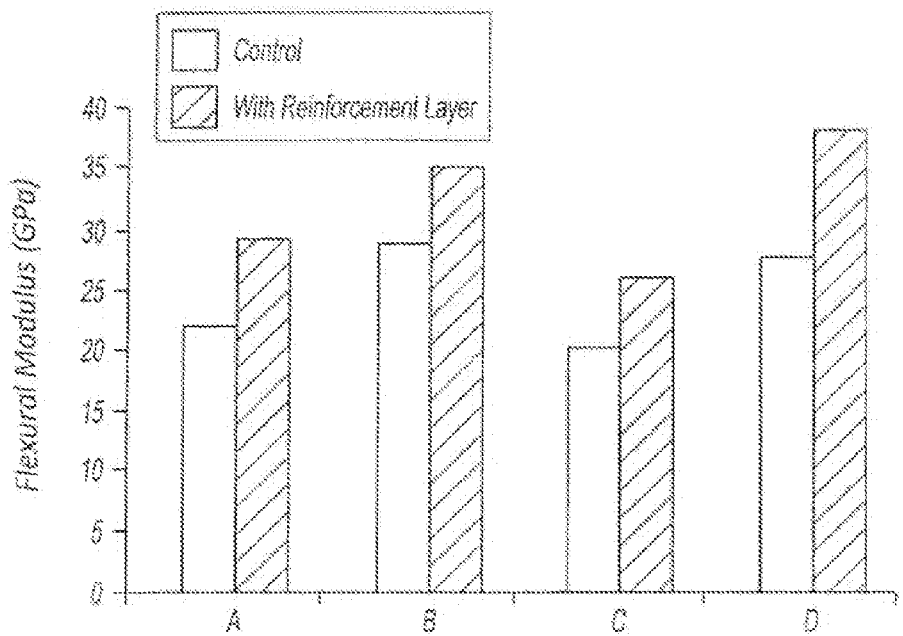
FIG. 5 shows a graphic representation of the flexural modulus of structural foams A, B, C, and D shown with and without a reinforcement layer.
Figure 6:
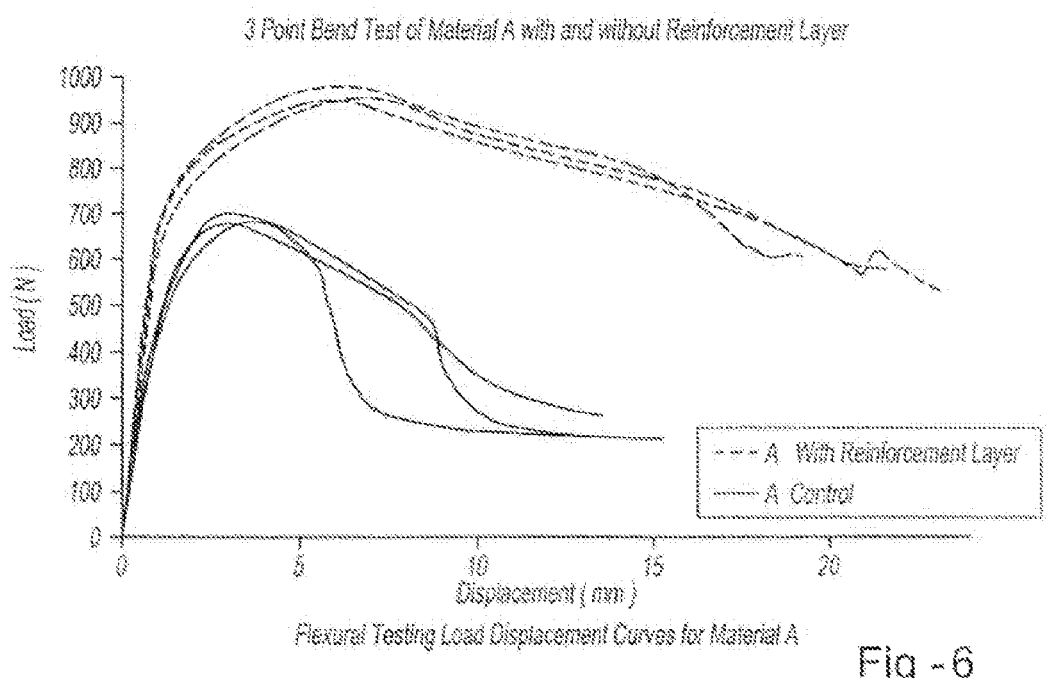
FIG. 6 shows a graphic representation of the flexural testing load displacement curves for structural foam A, shown with and without a reinforcement layer.
Figure 7:
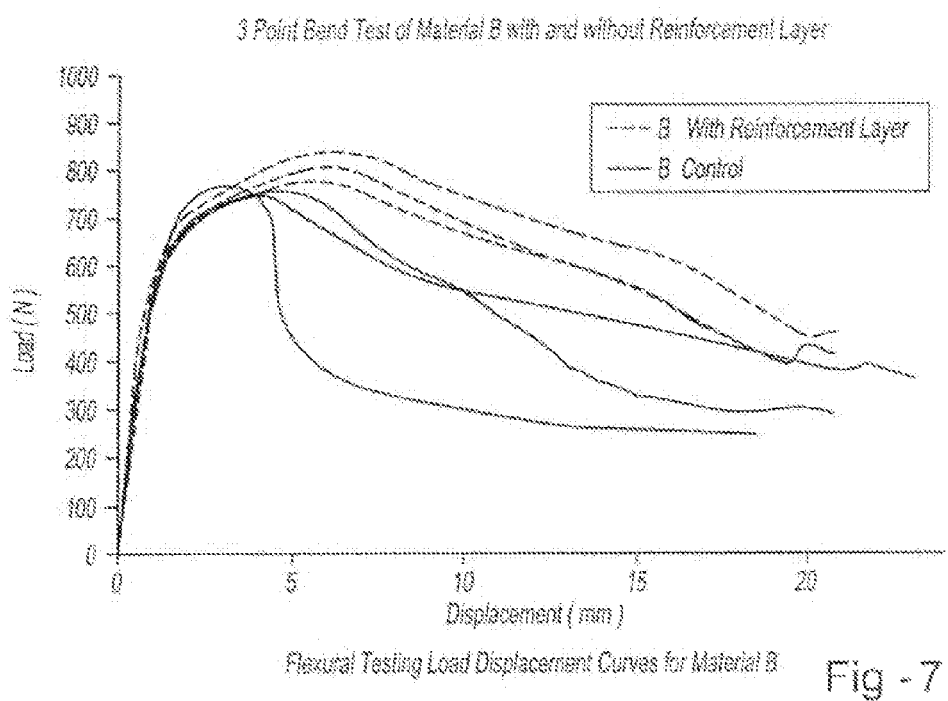
FIG. 7 shows a graphic representation of the flexural testing load displacement curves for structural foam B, shown with and without a reinforcement layer.
Figure 8:
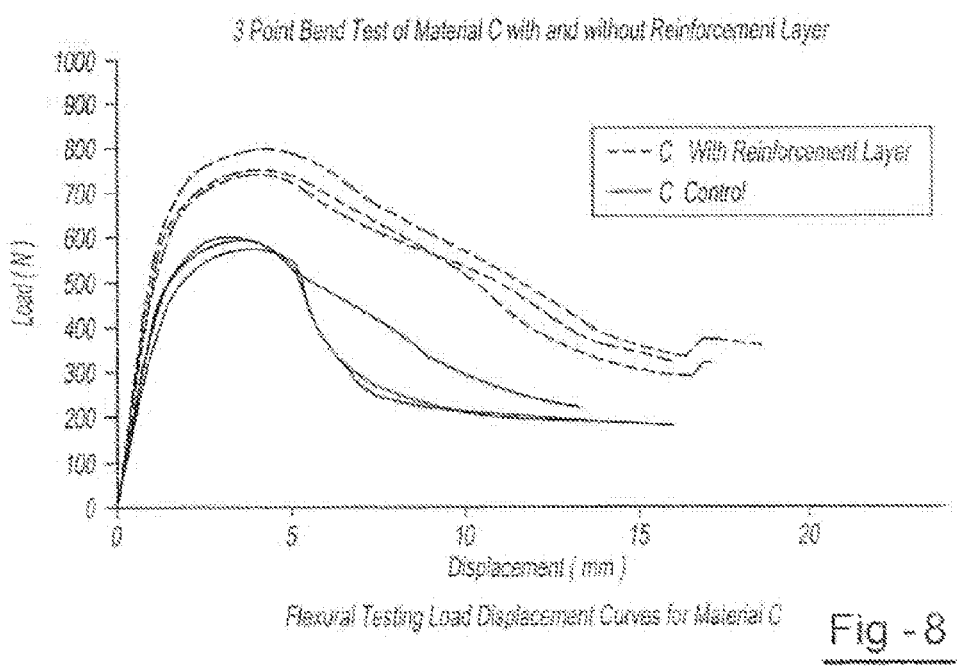
FIG. 8 shows a graphic representation of the flexural testing load displacement curves for structural foam C, shown with and without a reinforcement layer.
Figure 9:
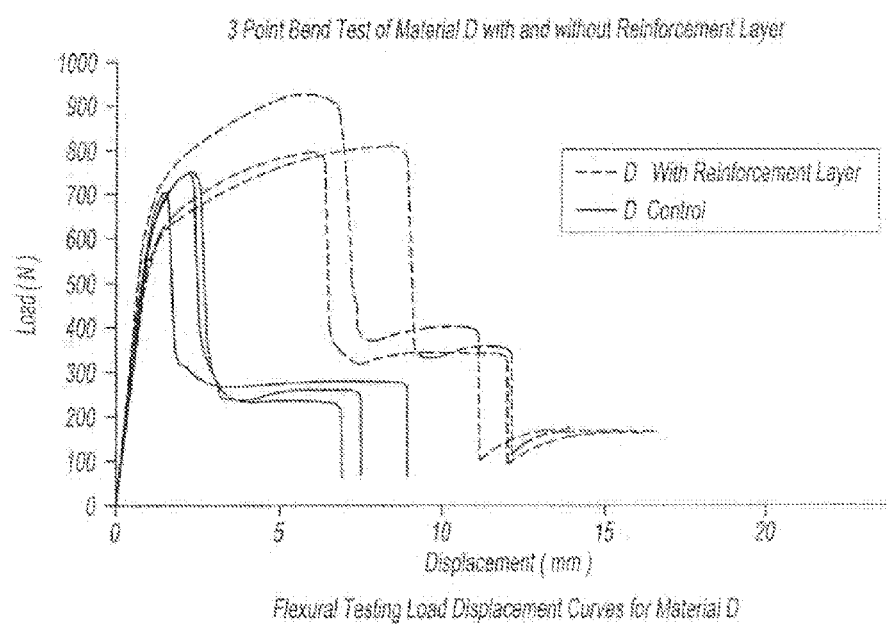
FIG. 9 shows a graphic representation of the flexural testing load displacement curves for structural foam D, shown with and without a reinforcement layer.

The improved bond between the reinforcement layer and structural foam also results in improved flexural strength and flexural modulus when comparing structural foams without a reinforcement layer to those including a reinforcement layer. Flexural strength and modulus was measured according to ASTM D790, using a 3-point bend testing mode. FIGS. 4 and 5 include graphic representations of the flexural strength and flexural modulus, respectively, of structural foams A, B, C, and D shown with and without a reinforcement layer.

The improved bond between the reinforcement layer and structural foam also results in improved energy absorption. FIGS. 6-9 include graphic representations of the flexural testing load displacement curves for structural foams A (FIG. 6), B (FIG. 7), C (FIG. 8) and D (FIG. 9), shown both with and without a reinforcement layer.

In Examples I, II and III below, the composite laminates are fabricated by locating a 0.18 mm thick polyethylene terephthalate film between two pieces of epoxy-based expandable structural foam. One example of this epoxy-based expandable structural foam is disclosed in U.S. Pat. No. 7,892,396. The resulting sandwich structure is compressed in a hot press at 180° F. for 2 to 3 minutes such that the film forms a middle layer of the composite laminate and the final thickness of the total structure is about 3 mm.

EXAMPLE I

Table 3 provides a comparison of two epoxy-based expandable structural foam properties in the neat state (e.g., with no reinforcement layer) and as a composite laminate, using polyester terephthalate film. All properties listed are for materials in the post-activation state.

Table 3 shows that the relative vertical rise of the composite laminate of this invention is higher than that of the neat material. The reinforcing layer constrains the lateral (horizontal or in-plane) movement of the activated material, resulting in the expansion to be directed perpendicular to the plane or axis of the reinforcing layer.

Lap shear strength is measured according to ASTM D1002, using a 3 mm bond line and an EG-60 metal substrate. Table 3 shows greater lap shear strength for the composite structures than the heat epoxy-resin adhesive. The reinforcing layer effectively reduces the apparent bond line, resulting in higher lap shear strengths.

Flexural testing is accomplished according to ASTM D790, using a 3-point bend testing mode. The test specimens were constructed using a sandwich configuration. The top and bottom substrates were 0.030" thick EG60 steel with dimensions of 1"×6". Structural foam filled the middle, giving a total thickness (foam and steel) of 6 mm. Table 3 shows greater flexural strength and modulus for the composite laminate samples than the neat epoxy-resin adhesive.

Tensile testing was conducted in the spirit of ASTM D638, using a JISK 6301-1-MET dog bone configuration at 10 mm wide, 3 mm thick and tested at a speed of 5 mm/min. The test specimens were constructed by expanding the foam between two release surfaces with 3 mm spacers and then die cutting the tensile bars while the samples were still warm. Samples containing the PET film have the film orientated in the plane of the sample so that under tension the film is being stretched along with the rest of the sample. Table 3 shows greater tensile strength and modulus for the composite laminate samples than the neat epoxy-resin adhesive.

TABLE 3

|  | Material B | | Material C | |
| --- | --- | --- | --- | --- |
|  | no reinforcement | w/reinforcement | no reinforcement | w/reinforcement |
| Vertical Rise | 2.16 | 2.34 | 2.77 | 3.10 |
| Lap Shear (MPa) | 3.68 | 5.03 | 2.97 | 4.21 |
| Flex Strength (MPa) | 122.5 | 143.3 | 94.4 | 120.4 |
| Flex Modulus (GPa) | 28.1 | 34.2 | 19.4 | 25.1 |
| Tensile Stress (MPa) | 5.5 | 16.2 | 4.8 | 10.3 |
| Tensile Modulus (MPa) | 685 | 1318 | 655 | 1065 |

EXAMPLE II

In this example, composite structural laminates are fabricated by pressing a 0.18 mm thick polyethylene terephthalate film between to pieces of epoxy-based expandable structural foam. An example of this epoxy-based expandable structural foam is similar to the activatable material disclosed in U.S. Pat. No. 7,892,396, except for the absence of a core/shell polymer impact modifier. The sandwich structure is compressed in a hot press at 180° F. for 2 to 3 minutes such that the film is essentially in the middle of the structure and the final thickness of the total structure is about 3 mm.

Table 4 provides a comparison of an epoxy-based expandable structural foam property in the neat state (with no reinforcement) and as a composite laminate, using polyester terephthalate film. All properties listed are for materials in the post-activation state.

TABLE 4

|  | Material D | |
| --- | --- | --- |
|  | no reinforcement | w/ reinforcement |
| Vertical Rise | 2.66 | 3.02 |
| Lap Shear (MPa) | 2.99 | 3.67 |
| Flex Strength (MPa) | 111.9 | 156.2 |
| Flex Modulus (GPa) | 27.1 | 37.3 |
| Tensile Stress (MPa) | 5.6 | 10.0 |
| Tensile Modulus (MPa) | 998 | 1152 |

Test details are the same as those given in Example I. Table 4 shows all properties of the composite laminate are improved over those of the neat epoxy-resin adhesive.

EXAMPLE III

Structural foam materials formed in accordance to the present invention have also exhibited desirable post activation compression properties. In particular, structural foam materials of the present invention were foamed to form samples that were then tested according to a method that is based upon ASTM C39. While the method is described herein, it should be understood that any unspecified parameters will be in accordance with ASTM C39.

Three distinct sample types were formed. The first sample was formed by foaming the neat (non-reinforced) epoxy based foam material in cylinders or cylinder cups followed by removing excess foam that extends out of the cylinders or cups (e.g., by cutting away foam that extends out of the cylinders or cups). The second sample was constructed by cutting discs from a flat composite laminate sample and stacking them in a cylinder or cylinder cup such that the plane of the PET reinforcing layers are perpendicular to the axis of the cylinder. This sample was then finished by foaming the layered composite laminate in the cylinders or cylinder cups followed by removing excess foam that extends out of the cylinders or cups (e.g., by cutting away foam that extends out of the cylinders or cups). The third sample was constructed by rolling a flat composite laminate sample and sliding them in a cylinder or cylinder cup such that the plane of the PET reinforcing layers are parallel to the axis of the cylinder. This sample was then finished by foaming the layered composite laminate in the cylinders or cylinder cups followed by removing excess foam that extends out of the cylinders or cups (e.g., by cutting away foam that extends out of the cylinders or cups).

The test samples are typically foamed to a volume that is less than 1000%, more typically less than 750% and even more typically less than 500% relative to the original volume of the structural foam material prior to foaming. This, is done to form cylindrical samples that are 60 mm in height and 30 mm in diameter. The cylinder samples are then tested according to ASTM C39.

Table 5 provides a comparison of cylinder compression properties of an epoxy-based expandable structural foam in the neat state and composite structural laminates where the PET film resides in stacked layers perpendicular to the cylinder axis and parallel to the cylinder axis. All properties listed are for materials in the post-activation state.

TABLE 5

| | Material C | |
|---|---|---|
| | Peak Compression Stress (MPa) | Compression Modulus (MPa) |
| Neat epoxy based structural foam | 4.7 | 420 |
| Film perpendicular to cylinder axis | 7.0 | 433 |
| Film parallel to cylinder axis | 15.6 | 1035 |

Table 5 shows that the orientation of the film has a large effect on the compression properties of the sample, and in every instance compression of the composite laminate sample is greater than the neat sample.

It is contemplated that an activatable composite laminate according to the present invention may be employed as a structural adhesive material. In such an embodiment, the composite material is typically activated and cured (e.g., at temperatures common to e-coat or automotive painting operations) to adhere to a first member and a second member. Contact with attachment surface of the first member and the second member may occur prior to or during activation and curing of the material. Examples of structural adhesive applications are disclosed in U.S. Pat. Nos. 6,887,914 and 6,846,559; and US Patent, Publication No. 2004/0204551, all of which are incorporated herein by reference for all purposes.

During use of the composite laminates, one or more fasteners or adhesives may be attached to the composite laminate for attachment to a cavity wall or other location within a cavity. The fasteners may be mechanical fasteners and may include but are not limited to push-pins, tree fasteners, hinges, screws, a mechanical interlock, integral locks, a male feature, a female feature or any combination thereof. The composite laminate may include one push pin on each opposing end of the composite laminate.

In addition to the improved physical characteristics of the composite laminate structures disclosed herein, the ease of manufacture associated with the composite laminates make them easily customized to any shape or size required for a given cavity. The composite laminates may be co-extruded and then easily modified (e.g., die-cut, sliced). They can be modified prior to distribution to a customer or on on-site during assembly of the composite laminate within a cavity.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It will be appreciated that the above is by way of illustration only. Other ingredients may be employed in any of the compositions disclosed herein, as desired, to achieve the desired resulting characteristics. Examples of other ingredients that may be employed include antibiotics, anesthetics, antihistamines, preservatives, surfactants, antioxidants, unconjugated bile acids, mold inhibitors, nucleic acids, pH adjusters, osmolarity adjusters, or any combination thereof.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method of forming a composite laminate for providing sealing, baffling or reinforcement to a structure, the method comprising:
  providing a reinforcement layer having a high surface tension of at least about 35 dynes/cm;
  locating an epoxy-based expandable structural foam material onto the reinforcement layer to form the composite laminate wherein the surface tensions of the structural foam and reinforcement layer are within about 15 dynes/cm of one another;
  exposing the composite laminate to a temperature greater than 150° C. prior to any activation of the expandable structural foam so that a covalent bond is formed between the reinforcement layer and structural foam;
  wherein the high surface tensions of the reinforcement layer and structural foam provide sufficient wetting for load transfer from the structural foam to the reinforcement layer to:
    i. increase the tensile modulus of the composite laminate relative to the structural foam without the reinforcement layer where the difference between the tensile modulus of the composite laminate and the tensile modulus of the structural foam without the reinforcement layer is a range from 154 MPa to 633 MPa post-activation; and
    ii. increase the lap shear strength of the composite laminate relative to the structural foam without the reinforcement layer where the difference between the lap shear strength of the composite laminate and the lap shear strength of the structural foam without the reinforcement layer is a range from 0.68 MPa to 1.35 MPa post-activation.

2. The method of claim wherein the reinforcement layer includes a carboxylic acid chemical functional group and the structural foam material includes a component that forms a covalent bond with the carboxylic acid of the reinforcement layer upon exposure to temperatures greater than 150° C.

3. The method of claim 1, wherein the reinforcement layer comprises a polymeric film of polyethylene terephthalate.

4. The method of claim 2, wherein the structural foam comprises an epoxy resin that forms the covalent bond with the carboxylic add of the reinforcement layer.

5. The method of claim 1, wherein the structural foam is located onto the reinforcement layer by a co-extrusion process.

6. The method of claim 5, wherein the covalent bond between the reinforcement layer and the structural foam is not formed during the co-extrusion process.

7. A method of forming a composite laminate for providing sealing, baffling or reinforcement to a structure, the method comprising:
  providing a polymeric reinforcement layer having a surface tension of at least about 35 dynes/cm wherein the reinforcement layer includes a carboxylic acid or an amine chemical functional group;
  locating an epoxy-based expandable structural foam material onto the reinforcement layer by a co-extrusion process to form the composite laminate wherein the structural foam material comprises:
    i. an epoxy resin;
    ii. an epoxy/elastomer adduct, the adduct including about 1:3 to 3:1 parts of epoxy to elastomer; and
    iii. a core/shell polymer impact modifier;
    wherein the epoxy resin forms a covalent bond with the carboxylic acid or amine of the reinforcement layer upon exposure to temperatures greater than 150 °C;
  exposing the composite laminate to a temperature greater than 150 ° C. prior to any activation of the expandable structural foam so that a covalent bond is formed between the reinforcement layer and structural foam;
  wherein the covalent bond allows for load transfer from the structural foam to the reinforcement layer to increase the tensile modulus of the composite laminate to:
    i. increase the tensile modulus of the composite laminate relative to the structural foam without the reinforcement layer where the difference between the tensile modulus of the composite laminate and the tensile modulus of the structural foam without the reinforcement layer is a range from 154 MPa to 633 MPa post-activation; and
    ii. increase the lap shear strength of the composite laminate relative to the structural foam without the reinforcement layer where the difference between the lap shear strength of the composite laminate and the lap shear strength of the structural foam without the reinforcement layer is a range from 0.68 MPa to 1.35 MPa post-activation.

8. The method of claim 7, wherein upon exposure of the composite laminate to temperatures greater than 150 ° C., the covalent bond between the reinforcement layer and the structural foam substantially prevents lateral expansion of the foam so that expansion of the foam is substantially vertical.

* * * * *

UNITED STATES PATENT AND TRADEMARK OFFICE
CERTIFICATE OF CORRECTION

| | | |
|---|---|---|
| PATENT NO. | : 9,096,039 B2 | Page 1 of 1 |
| APPLICATION NO. | : 13/040704 | |
| DATED | : August 4, 2015 | |
| INVENTOR(S) | : Craig Chmielewski | |

It is certified that error appears in the above-identified patent and that said Letters Patent is hereby corrected as shown below:

Claims

Column 15, Claim 4, Line 46, "add" should be "acid"

Signed and Sealed this
First Day of December, 2015

Michelle K. Lee
*Director of the United States Patent and Trademark Office*